June 5, 1962 C. FIELD 3,037,366

ICEMAKER

Filed March 17, 1959 8 Sheets-Sheet 1

INVENTOR
CROSBY FIELD

BY Curtis, Morris & Safford
ATTORNEYS

June 5, 1962 C. FIELD 3,037,366

ICEMAKER

Filed March 17, 1959 8 Sheets-Sheet 2

INVENTOR
CROSBY FIELD

BY Curtis, Morris & Safford
ATTORNEYS

ICEMAKER

Filed March 17, 1959

INVENTOR
CROSBY FIELD
BY
Curtis, Morris & Safford
ATTORNEYS

June 5, 1962 C. FIELD 3,037,366

ICEMAKER

Filed March 17, 1959 8 Sheets-Sheet 4

INVENTOR
CROSBY FIELD

BY Curtis, Morris & Safford
ATTORNEYS

INVENTOR
CROSBY FIELD
BY *Curtis, Morris & Safford*
ATTORNEYS

June 5, 1962 C. FIELD 3,037,366

ICEMAKER

Filed March 17, 1959 8 Sheets-Sheet 6

INVENTOR
CROSBY FIELD
BY Curtis, Morris & Safford
ATTORNEYS

ICEMAKER

Filed March 17, 1959 8 Sheets-Sheet 7

INVENTOR
CROSBY FIELD
BY
Curtis, Morris & Safford
ATTORNEYS

June 5, 1962 C. FIELD 3,037,366

ICEMAKER

Filed March 17, 1959 8 Sheets-Sheet 8

INVENTOR
CROSBY FIELD

BY Curtis, Morris & Safford
ATTORNEYS

United States Patent Office 3,037,366
Patented June 5, 1962

3,037,366
ICEMAKER

Crosby Field, Brooklyn, N.Y., assignor to Flakice Corporation, Brooklyn, N.Y., a corporation of Delaware
Filed Mar. 17, 1959, Ser. No. 800,047
15 Claims. (Cl. 62—345)

This invention relates to the art of congealing, and to apparatus for use in connection therewith. Thus, for example, the invention may be used for making ice or in general for congealing material to convert it from a liquid state into a solid state. The present invention is related to those disclosed in my United States Letters Patents Nos. 2,610,474 and 2,610,476, issued September 16, 1952, and in my co-pending application for United States Letters Patent, Serial No. 644,260, filed March 6, 1957, now Patent No. 2,990,199.

An object of this invention is to provide improved freezing apparatus. Another object is to provide improved evaporators which may be constructed in large sizes. Another object is to provide heat transfer constructions having heat transfer surfaces of predetermined curvatures. A further object is to provide improved methods and apparatus for congealing liquids. A still further object is to provide for the above with apparatus which is simple in construction, inexpensive to manufacture and maintain and operate, adaptable to various conditions of use, and readily serviced. These and other objects will be in part obvious and in part pointed out below.

In the description below, the liquid being congealed is referred to at times as "water" and the product is called "ice," and the congealing operation is referred to at times as "freezing." Except where specifically indicated, these references to "water," "ice" and "freezing" are illustrative only, and are not limiting; it will be understood that other liquids may be congealed so as to produce products other than "ice," and that the circulation and handling operations are similar or the equivalent.

The illustrative embodiment of the present invention is an icemaking machine or apparatus having a stationary evaporator and an endless freezing belt which is moved along a cooling surface of the evaporator. Liquid to be frozen is supplied to the surface of the belt through the zone where it is cooled by the evaporator. The present invention provides better heat transfer over the entire surface of the evaporator, an effective system of cooling the liquid to be frozen prior to its entrance upon the freezing belt, an evaporator which is less expensive to make, and includes many other improvements which will become obvious as the following description is read.

In the drawings:

FIGURE 1 is a side elevation view of an ice maker constituting one embodiment of the invention;

FIGURE 1*a* is a fragmentary view of the right-hand portion of the icemaker of FIGURE 1 showing the idler pulley in the position for removal or installation of a freezing belt;

Figure 3:
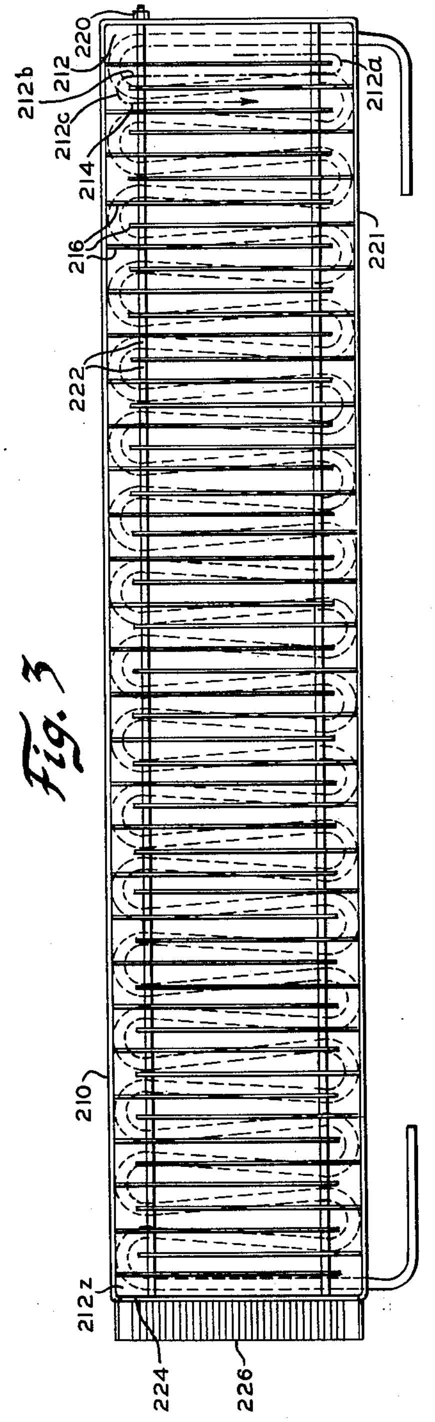
FIGURE 3 is a plan view of one of the water precooling or forecooler trays.
Figures 3A, 4, 5:
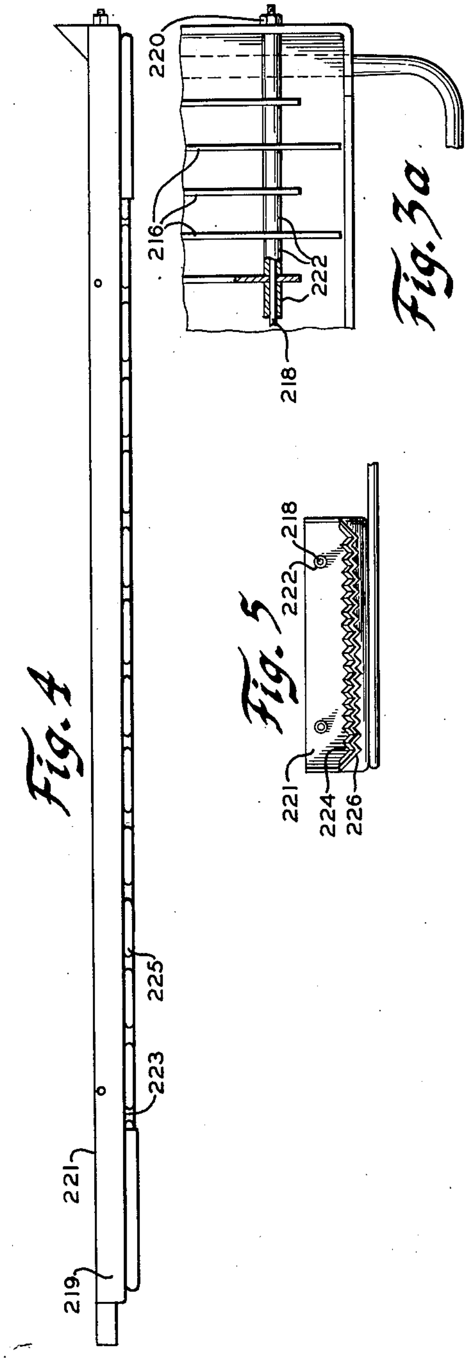
Figure 6:
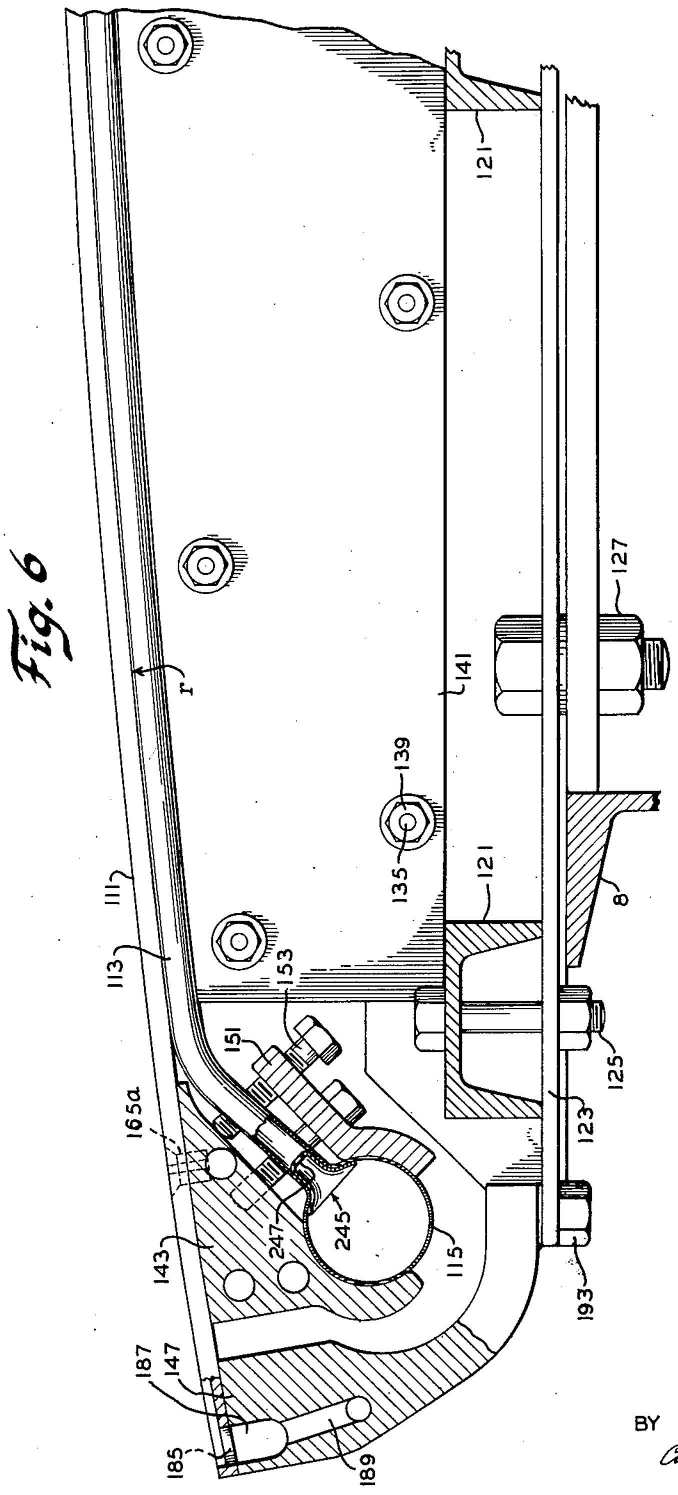
Figure 14:
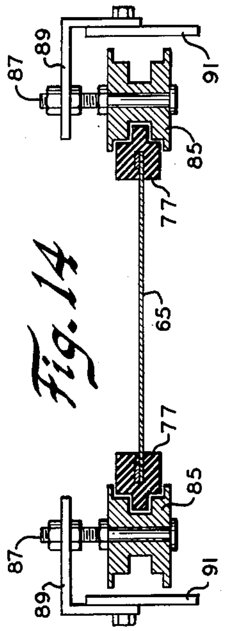
Figure 13:
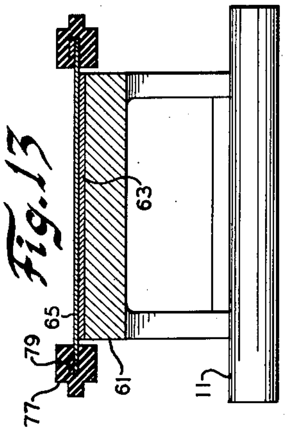
Figure 6A:
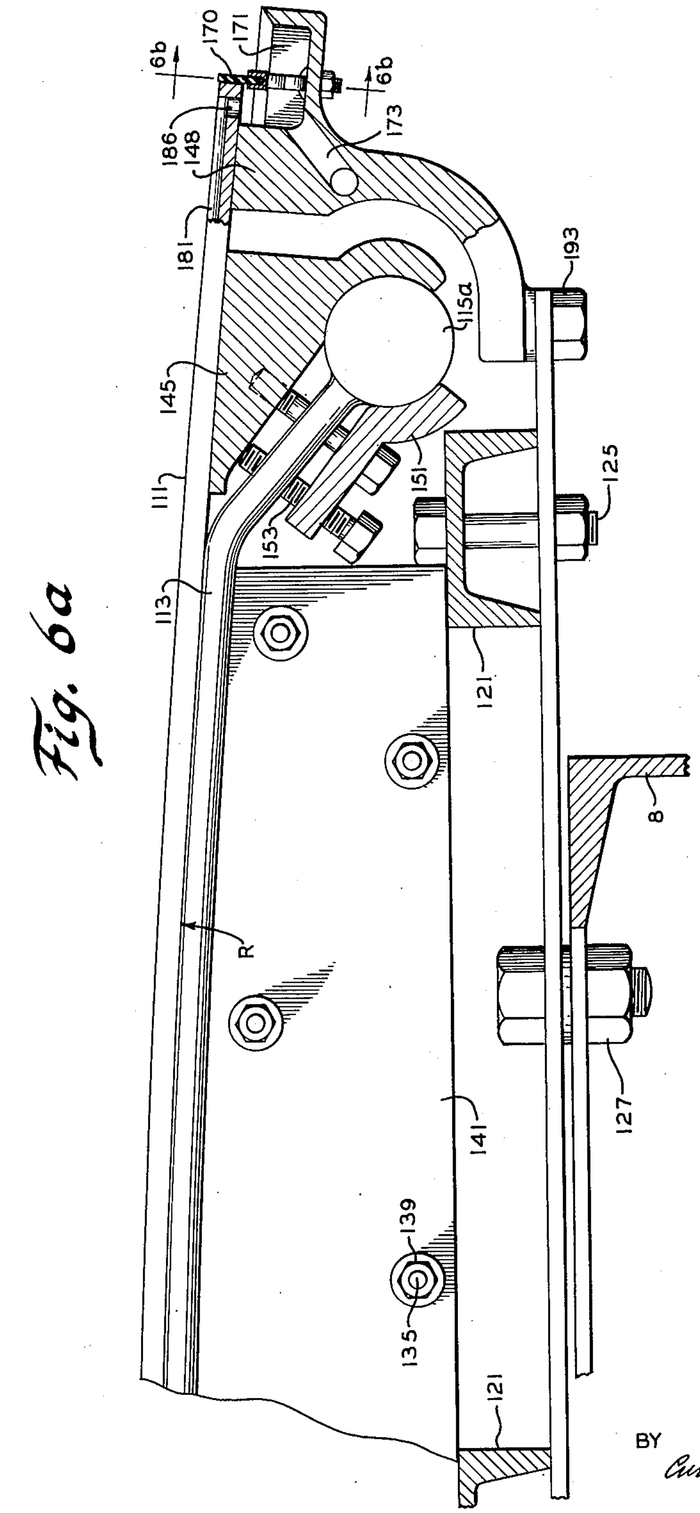
Figure 6B:
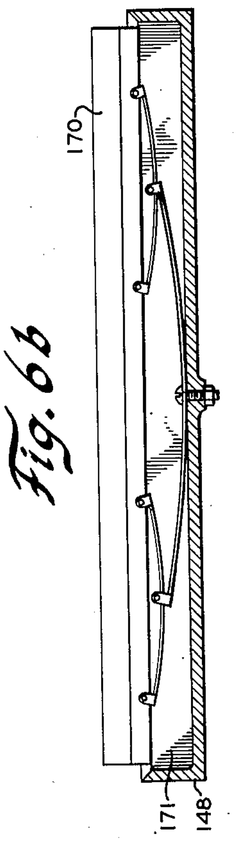
Figure 7:
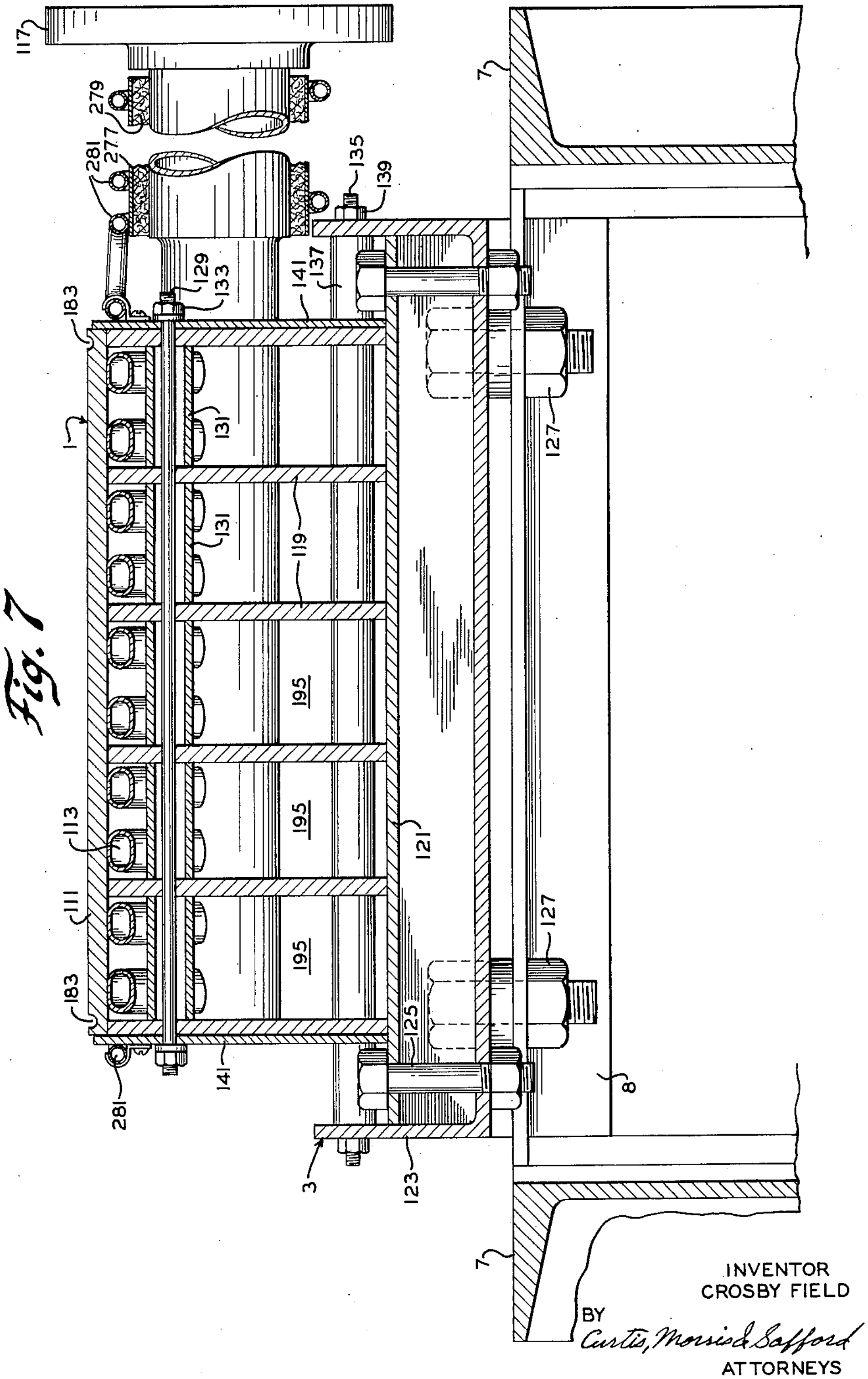
Figures 8, 9, 10:
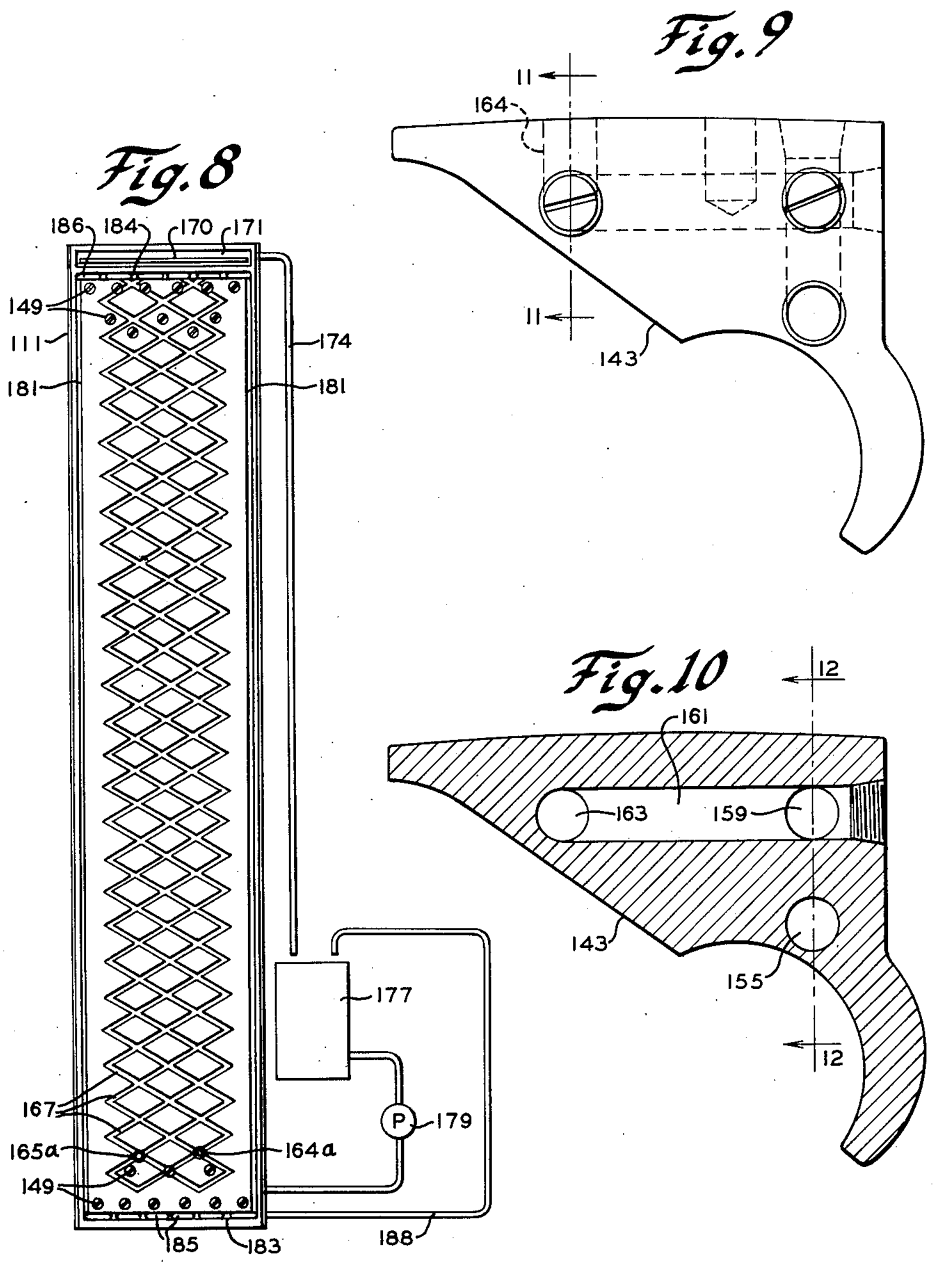
Figure 11:
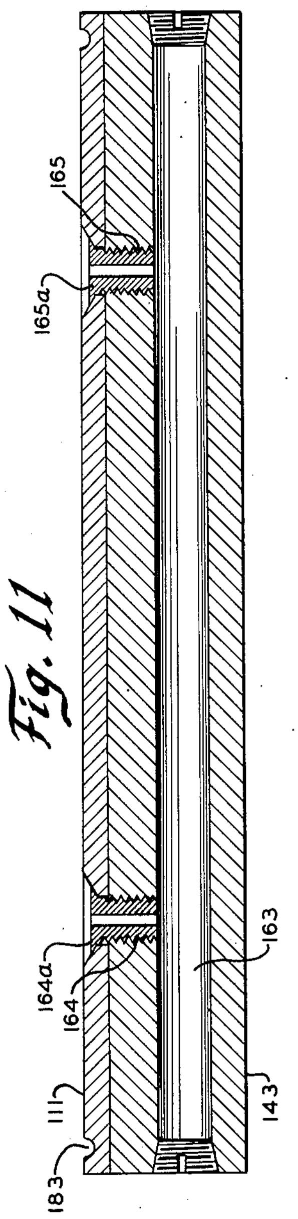
Figure 12:
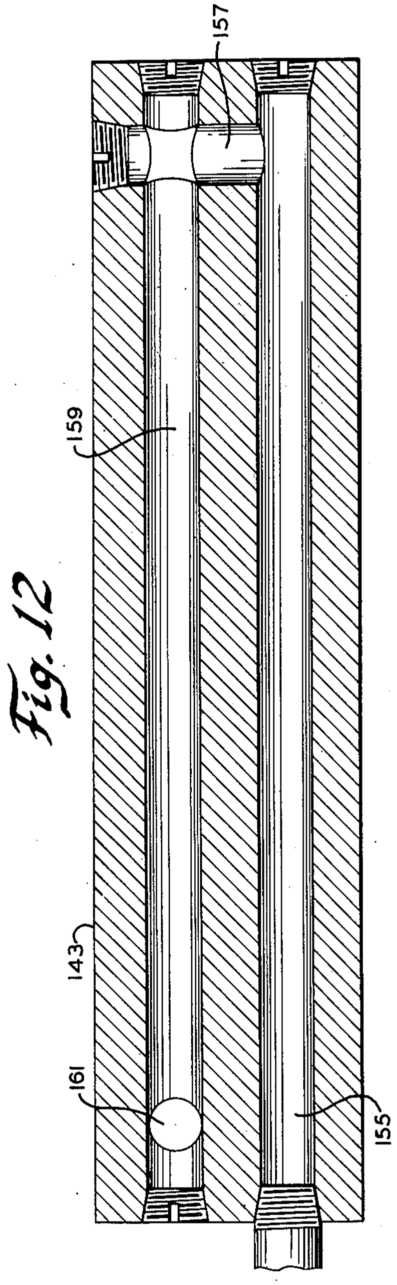

FIGURE 3*a* is a fragmentary plan view on an enlarged scale of one end of the tray of FIGURE 3;

FIGURES 4 and 5 are side and end views, respectively, of one tray of FIGURE 3;

FIGURES 6 and 6*a* are fragmentary sectional views showing the refrigerant feed and discharge ends of the evaporator, respectively;

FIGURE 6*b* is a sectional view taken on the line 6*b* of FIGURE 6*a* showing the lubricant wiper;

FIGURE 7 is a cross-section of the evaporator;

FIGURE 8 is a plan view of the evaporator showing the lubricant channels and including a diagrammatical representation of the lubricant recirculating system;

FIGURE 9 is an enlarged view of the feed end casting showing the lubricant and refrigerant channels;

FIGURE 10 is a sectional view of the feed end casting showing the lubricant and refrigerant channels;

FIGURE 11 is a sectional view taken on line 11—11 of FIGURE 9;

FIGURE 12 is a sectional view taken on line 12—12 of FIGURE 10;

FIGURE 13 is a fragmentary sectional view of one of the pulleys and the freezing belt in contact therewith; and, FIGURE 14 is a sectional view of the belt showing the guide rollers and their supporting brackets.

Figure 1:
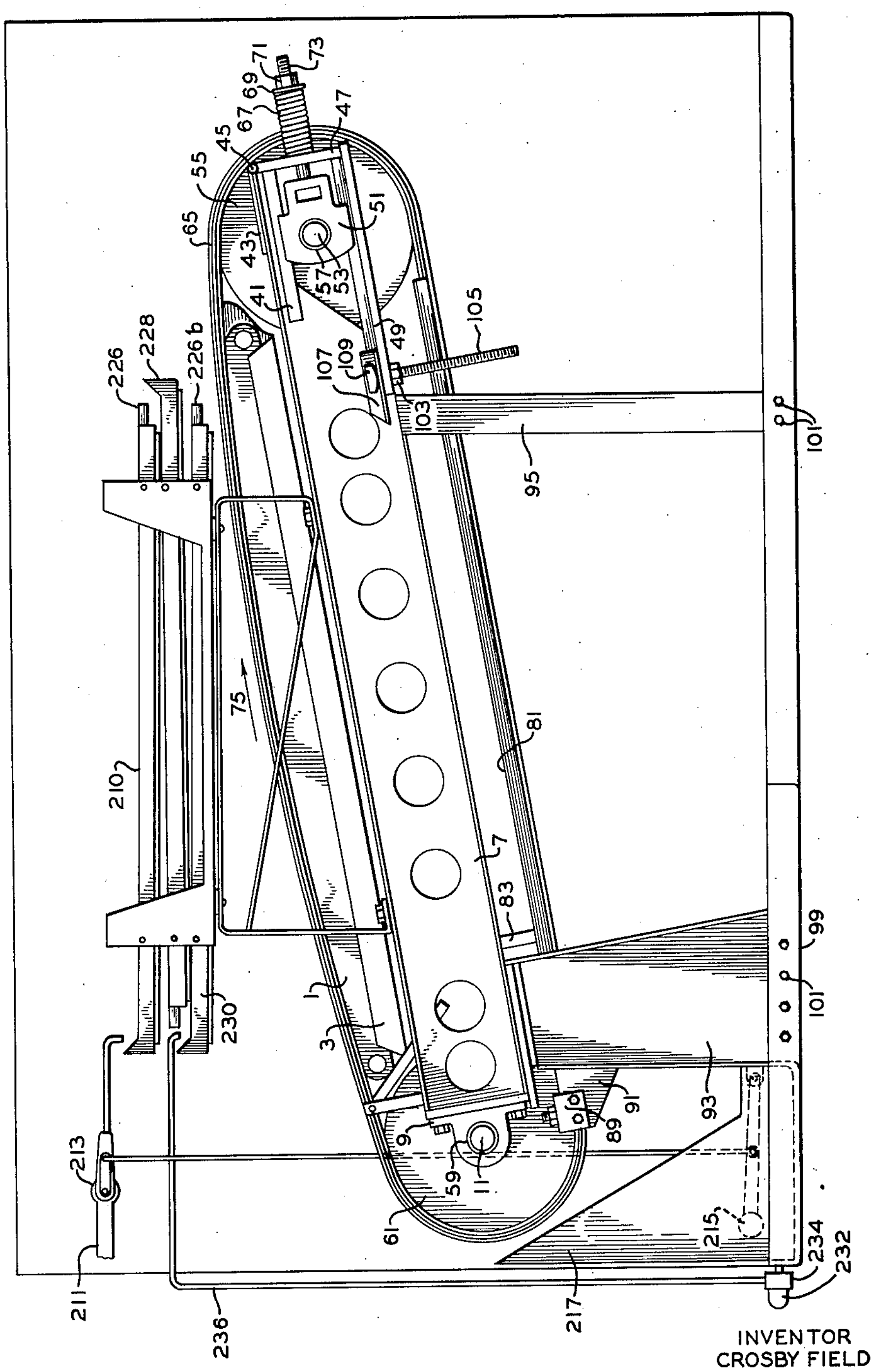
Figure 2:
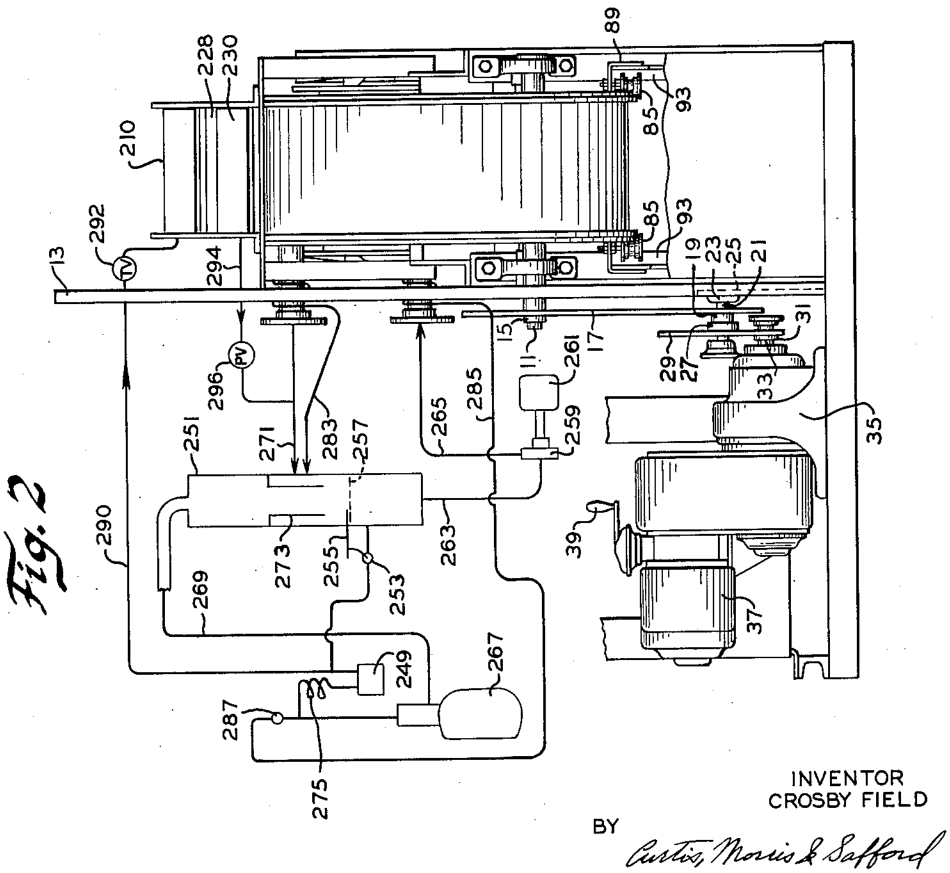
FIGURE 2 is an end view of the icemaker of FIGURE 1, and includes a diagrammatical representation of the refrigerant condensing unit and the refrigerant recirculating system.

Referring particularly to FIGURES 1 and 2 of the drawing, the icemaker has an evaporator 1 mounted upon an evaporator frame 3 in the manner described more fully hereinafter in connection with FIGURES 6, 6*a* and 7. The sub-assembly of evaporator 1 and evaporator frame 3 is supported upon a base frame 7 by bolts and nuts (see FIGS. 6 and 7). At the lower end (left-hand portion of FIGURE 1) of frame 7 are fastened two bearings 9 carrying a shaft 11. One end of the shaft 11 (FIGURE 2) projects through a clearance hole in an insulated partition 13, and carries a sprocket 15. Sprocket 15 is driven by a chain 17 which, in turn, runs on a sprocket 19 on a jackshaft 21. Jackshaft 21 is held in a bearing 23 supported by a pedestal 25. A sprocket 27 on shaft 21 is driven by a chain 29, which in turn is driven by a sprocket 31 on a shaft 33 of a speed reducer 35. This variable speed reducer 35 receives its power from electric motor 37, and the speed may be controlled by handle 39 on the speed reducer.

As best shown in the right-hand portion of FIGURE 1, the upper end of each of the frame members 7 is cut away, as shown, and has welded to its upper portion a top guide bar 41 and a hinge plate 43. Each of the hinge plates 43 has hinged to it by a pin 45 a right-angle rigid bracket 47, formed by a transverse portion extending transversely of its frame member 7 and a longitudinal portion 49 clamped in alignment with guide bar 41. The left-hand end of the longitudinal portion 49 is clamped to an angle bracket 107 welded to frame member 7 by a bolt 105 having a head 109 and a nut 103. Each of the longitudinal portions 49 has a guide bar which cooperates with the guide bar 41 above it to support a sliding bearing 51. Bearing 51 has a pair of grooves into which the guide bars are received, thus to permit the bearings to move longitudinally of the frame construction formed by the frame members 7.

Each of the pair of bearings 51 has a bearing bushing 57, and an idler shaft 53 is freely journaled in these bushings, thus to provide a free-turning mounting for the shaft. Mounted upon and keyed to shaft 53 is a belt drum or pulley 55 which supports the right-hand or elevated end of the endless freezing belt 65. The other end of belt 65 is supported by a similar drum or pulley 61 which is keyed to shaft 11 and rotatably mounted in a pair of bushings 59 of stationary bearings 9 which are mounted respectively on the ends of the frame member 7. Pulleys 55 and 61 are of rigid steel and have their cylindrical faces covered by a layer 63 of an elastomer, namely, rubber (see FIGURE 13).

The upper run of belt 65 is drawn over the curved, upper surface of evaporator 1, so that the upper surface of the upper run of the belt is maintained at a low temperature. The lower run extends tangentially between pulleys 61 and 55, and is protected by a cover 81 which is supported by four brackets 83 and extends between the pulleys. The belt is held under tension by a pair of springs 67 positioned on the opposite sides of the belt and each biasing or urging its bearing 51 to the right. Each spring 67 surrounds a threaded rod 73 which is attached to its bearing 51 at the left and carries a washer 69 and a nut 71 at the right, and the spring is compressed between bracket 47 and the washer. Hence, by tightening the two nuts 71, the bearings with shaft 53 and pulley 55 are urged to the right toward the belt tightening position. The nuts may be loosened to reduce the belt tension. In the illustrative embodiment, the belt is driven from pulley 61 in a clockwise direction; that is, with the upper run moving to the right in FIGURE 1. The invention contemplates that the belt may be moved in the opposite direction when the use, circumstances or operating conditions make that desirable.

As shown best in FIGURE 13, each edge of belt 65 has bonded to it a continuous dam structure 77 which is formed by a fabric strip 79 along the top surface of the belt and a body of an elastomer, e.g., rubber. The dam structures 77 form dams at the sides of the belt so as to retain the liquid or fluid being congealed upon the congealing surface. The dam structures also provide heat insulation so as to prevent condensation of moisture upon the under surface of the belt. Referring again to FIGURES 1 and 13, the dam structures 77 also act as flanges and guards which extend upon the opposite sides of pulleys 61 and 55 and evaporator 1, thus to aid the tracking of the belt.

As shown in FIGURES 1 and 14, at the lower edge of pulley 61 these two dam structures pass between a pair of guide rollers 85. Each of rollers 85 is rotatably supported by a pin 87 rigidly mounted upon a bracket 89 which is bolted to the adjacent vertical upright pedestal 93. Rollers 85 are of nylon which is an illustrative insulating and anti-friction plastic. When the belt is perfectly centered during normal operating conditions, neither of the dam structures 77 contacts the adjacent roller 85. However, if the belt starts to lose its proper tracking and moves to the side only a slight distance, one of the dam structures contacts its roller and the belt is diverted back towards its proper tracking position. Thus, the belt is maintained in alignment within the zone where it passes onto the lower roller 61 preparatory to passing along the evaporator surface.

As shown best in the upper portion of FIGURE 1, water or other liquid to be congealed is precooled by three forecoolers 210, 228 and 230 which are supported by a pair of frame constructions bolted to and extending upwardly from the frame member 7. Water is supplied to forecooler 210 through a pipe 211 having a valve 213 which is controlled by a float 215 in a sump tank 217. The water in tank 217 is recirculated by a pump 234, which is driven by a motor 232 and which delivers water through a pipe 236 to forecooler 230. When the water level in tank 217 falls, float 215 moves downwardly and opens valve 213, thus to supply feed water to forecooler 210. The water from the right-hand end of forecooler 210 flows through a feedplate 226 to forecooler 228, and flows from the left-hand end of forecooler 228 into forecooler 230. The water from the right-hand end of forecooler 230 flows through a feedplate **226*b* onto the belt 65. The water flows downwardly and to the left along the belt throughout the zone where the belt contacts the evaporator, and the unfrozen water flows down from the left-hand end of the belt into tank 217**.

Figure 1A:
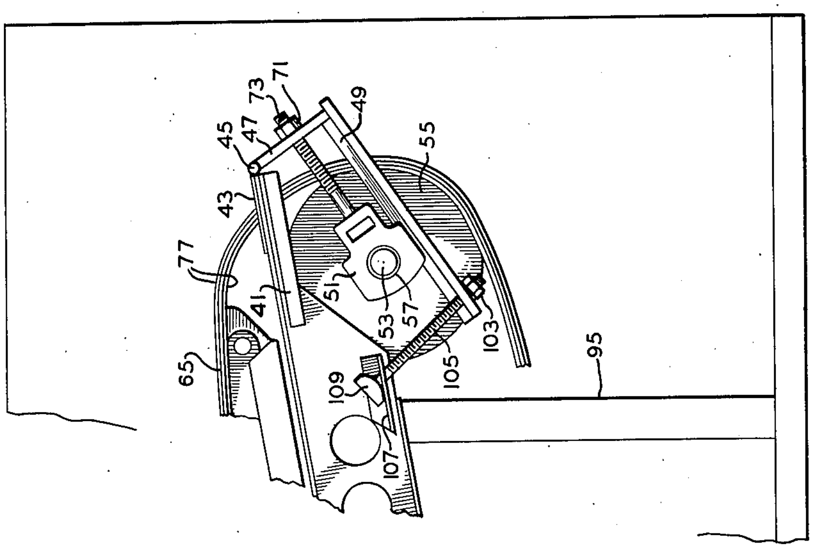

The entire belt and evaporator assembly is rigidly supported through the two frame members 7 upon two pairs of pedestals 93 and 95 (see also FIGURE 2). These pedestals are secured to the base frame 99 by bolts 101, and the two pedestals on the right-hand side of the machine in FIGURE 2 (see FIGURE 1) are readily removable. When these two pedestals are removed, the structure is still supported by the other two pedestals, although the machine is operated only when all four pedestals are in place. However, when it is desirable to remove the belt 65, the nuts 71 and washers 69 and the springs 67 are first removed, thus releasing the tension from the belt and permitting bearings 51, shaft 53 and pulley 55 to slide to the left. Nuts 71 are then placed back onto the ends of rods 73, as shown in FIGURE 1A, and the nuts 103 on bolts 105 are loosened to the position of FIGURE 1*a*. This permits bearing 51, shaft 53 and pulley 55 to swing downwardly about the hinge pins 45, so that the elements are at rest, as shown in FIGURE 1*a*. The two near pedestals of FIGURE 1 are then removed, and the belt may be lifted and removed from the pulleys.

Evaporator 1 comprises a plate 111 (see FIGS. 6, 6*a* and 7), preferably of aluminum, to which has been attached, by brazing or welding, parallel refrigerant tubes 113. At the respective ends, tubes 113 are welded into headers 115 and **115*a*, the flanges 117 of which are connected to the refrigerant piping described hereinbelow. In this embodiment, there are ten refrigerant tubes 113, and the tubes are slightly flattened to increase the heat transfer rate between plate 111 and the refrigerant within the tubes. Evaporator plate 111 is supported on a series of radius guide plates 119, which in turn are supported on their lower edges by a series of transverse channels 121, which are fastened to longitudinal angles 123 by bolts and nuts 125. The longitudinal angles 123 are supported on cross braces 8 extending between frame members 7 by bolts and nuts 127. Radius guide plates 119 are maintained in the correct transverse positions by rods 129, spacing tubes or sleeves 131 and nuts 133 near the top, and by rods 135, spacing tubes 137 and nuts 139 near the bottom. The lower spacing rod sub-assembly includes the longitudinal angles 123 thus lining up the radius guide plates with the evaporator sub-assembly, which then may be lined up with the frame of the machine by means of bolts and nuts 127. The sub-assembly includes two insulating plates 141 which extend along the sides of the respective outer radius guide plates 119** and up alongside the evaporator plate to minimize or prevent the formation of condensation or ice thereon.

Referring again to FIGURE 1, for a given tension on belt 65 maintained by the springs 67 and affected by the friction between the belt 65 and the evaporator plate 111, and the speed of the belt over the evaporator, the pressure exerted by the belt on the surface of the evaporator and normal thereto is proportional to the reciprocal of the radius of curvature of the evaporator plate 111. At certain parts of the evaporator, such as near the beginning of the contact between the belt and the evaporator, good contact is more important than later. Therefore (see also FIGURES 6 and 6*a*) the radius *r* is somewhat smaller than the radius R. These radii, *r* and R, are carried out to the ends of the evaporator by means of aluminum or other high heat conducting castings 143, 145, 147 and 148, respectively, screwed to the evaporator plate 111 by means of screws 149 (see also FIG. 8). The surfaces of these castings 143, 145, 147 and 148, where they contact the underside of the plate 111, are of suitable radii to give the top surface of plate 111 the radius *r* and the radius R, at the respective ends of the evaporator plate 111.

Referring more particularly to FIGS. 6, 6*a* and 9 to 12, castings 143 and 145 are shaped so as to hold the headers 115 in their required location and in good heat transfer relationship, thus to conduct heat from the evaporator plate through the castings and the header tube 115 to the evaporating refrigerant in the tubes 113. This is accomplished by clamps 151 held securely by screws 153 respectively against headers 115 and casting 143 and against header **115*a* and casting 145. Casting 143 has a series of passages 155, 157, 159, 161, 163, 164 and 165, of which passages 164 and 165 are closed at their upper ends by screws 164*a* and 165*a*. Screws 164*a* and 165*a*** have passages through them. The heat transfer lubricant is pumped by a measuring or metering pump 179 through conduit to passages 155, 157, 159, 161 and 163 and the passages in the screws 164 and 165, thence into grooves 167 in evaporator plate 111 (see FIG. 8). The lubricant is carried along the evaporator plate surface in contact with the freezing belt, partly by the pressure of the pump transmitted through the column of lubricant to the lubricant in the grooves; and partly by its adhesion to the under-surface of the belt, until it is wiped off the belt by the wiper 170. The lubricant from wiper 170 collects in the catch basin 171 and flows back through passages 173 and conduit 174 to the supply tank 177 to the lubricant feed pump 179.

Any excess of lubricant in the grooves will empty into groove 184, thence will fall through slots 186 into catch basin 171, and returns to the supply tank 177, as described above. Should more than sufficient lubricant to fill the grooves be pumped at any time, the excess will fall into slot 183, and will return to supply tank 177 through holes 185 into catch basin 187 in casting 147 (FIG. 6). It then continues by gravity into channels 189 through conduit 188 back into lubricant supply tank 177. To prevent excess lubricant from flowing over the longitudinal edges of the evaporator plate 111, two parallel grooves 181 are provided, one near each edge. These grooves 181 connect with groove 184 at the top and with groove 183 at the bottom, so that any excess lubricant caught in these grooves will flow back to the supply tank 177 by these channels. Castings 147 and 148 also fasten the plate 111 to the longitudinal angles 123 by means of screws 193. After the evaporator sub-assembly described has been completed, all interior spaces, such as 195, are filled with a foam insulation.

*The Water System*

As has been indicated above, the water or other liquid to be frozen enters the forecooler system through pipe 211 (FIG. 1) from a source not shown, and controlled by a valve 213 connected to a float 215 in the water tank 217. This forecooler 210 (FIGS. 3, 4 and 5) comprises a metal tray 219 with sides 221 and a bottom 223, to the bottom of which are brazed refrigerant tubes 225 in which refrigerant is evaporated at a temperature higher than the temperature of the refrigerant in the evaporator attached to plate 111. This fresh or makeup water travels along the passages 212, **212*a*, 212*b* as indicated by the arrow 214, which passages are formed by fins 216. Fins 216 are held in close contact with the bottom refrigerated plate 223 by rods 218** (see FIG. 3*a*) which are secured to the sides 221, the rods passing through holes in sides 221 and being locked in place by nuts 220. The fins 216 are separated by spacer tubes or sleeves 222 on the rods 218. The last passage **212*z* has for its bottom edge a series of V-shaped weirs 224 over which the liquid flows onto a corrugated feed plate 226 from which it falls into the next forecooler 228. Forecoolers 228 and 230 are identical to forecooler 210. Forecooler 230 is supplied not only by the liquid from plate 228, but also by water from the tank 217. This water is the excess unfrozen water from the belt 65 which passes over the belt and falls off its lower end into tank 217 whence it is raised by pump 234 through conduit 236 and flows into forecooler tray 230, where it mixes with the water received from forecooler 228. The combined water flows onto belt 65 over weir feed corrugated plate 226*b*. The spacing of the fins in tray 230** is greater than that in the other two trays, to allow for the greater quantity of liquid being cooled.

Referring again to FIGURE 6, a nozzle 245 is positioned in the end of each of the tubes 113 where it is welded into the header 115. Nozzles 245 are press fitted or otherwise fastened to the tube so as to remain in place. The orifice 247 in each tube is so proportioned as to divide the refrigerant equally between the tubes, or the distribution of refrigerant may be different, as may be desired. The nozzles prevent boiling of the refrigerant before it reaches the nozzle orifice 247, i.e., they maintain a pressure head between the pump discharge and the nozzles. The pressure drop across the nozzles creates rapid evaporation, bubbling and turbulence in the tube, all of which is conducive to a high rate of heat transfer.

The refrigeration system of the icemaker will now be described, it being understood that the diagrammatic showing of the condensing unit and the refrigerant recirculating system, omits the accessories such as the refrigerant controls and the oil separators, etc.; these may be as disclosed in my copending application, Serial No. 644,260, filed March 7, 1957, or otherwise as is known in the art. Refrigerant from a receiver 249 (FIG. 2), flows into a surge drum 251 through a valve 253 controlled by a level-responsive controller 255 so that the level of the liquid refrigerant in the surge drum 251 remains at or about the level 257. The liquid refrigerant is pumped by a pump 259, driven by a motor 261, through conduits 263 and 265 into a header 215 and thence into tubes 113 through orifices 247 in nozzles 245. The mixture of boiling liquid refrigerant and gaseous refrigerant is gathered in header **115*a* and is pulled through conduit 271 into surge drum 251 by the suction of the compressor 267 through suction pipe 269. As this gas and liquid mixture enters the surge drum, the increase in volume of the gas reduces its velocity, so that the entrained liquid refrigerant drops to the bottom of the drum. The gas is withdrawn through conduit 269, first passing through liquid separator 273, which separates out and returns to body of liquid such droplets of liquid as have not already been separated out. Compressor 267 forces the gas under pressure into condenser 275, where it is liquified and passes into receiver 249. The recovered liquid in the surge drum 251 is recirculated through the evaporator tubes 113, as has been described. Liquid refrigerant from receiver 249 also flows through a conduit 290 having an expansion valve 292 therein to the refrigerant tubes 225 of the forecoolers 210, 228 and 230. The refrigerant flows from the forecoolers through a conduit 294 having a pressure drop valve 296 therein to conduit 271, and thence to the surge drum 251. Valve 296 maintains the proper pressure in conduit 294** to obtain the desired precooling of the water in the forecoolers.

In order to prevent condensation which might freeze to the insulation 141 (see also FIG. 7) at the edge of the evaporator plate 111, metal cylinders 277 are provided and insulation 279 around the extensions of the headers 115 and **115*a* to their flanges 117. Fastened in heat transfer relationship to each of the metal cylinders 277 is a coil formed by metal tube 281 which continues along and is fastened to insulation 141. Tube 281 is continued around the top edge of the evaporator and back on the other side. The two ends of tube 281 are connected, respectively, to conduits 283 and 285 (see FIG. 2). Conduit 285 delivers hot gas under pressure from the compressor through a manually adjustable valve 287 to the heating tube system just described. The refrigerant from the heating tube system flows through conduit 283** to the surge drum.

Water or other liquid to be frozen is delivered to the belt from the forecoolers and is recirculated, as has been described. That portion of the water or other liquid frozen into ice continues on the belt until the belt passes over the idler pulley 55 (see FIG. 1), where it is dislodged by a peeling action due to the increased curvature of the belt. The ice falls into a storage bin or to a location where it is consumed.

It has been pointed out above that the evaporator surface along which the belt passes has two radii of curvature, the smaller radius being at the end of the freezing path were the belt moves into the freezing surface. This curvature is such that very close contact is maintained between the belt and the evaporator surface. The tension on the belt produces a pressure normal to it which is an inverse function of the radius of curvature of the belt and, of course, of the surface which the belt contacts. In this embodiment, the zone of lesser radius is one-third the length of the evaporator surface. That is, the belt is maintained at this lesser radius of curvature through substantially one-third of the freezing path or zone. The zone of greater radius of curvature extends for the remaining two-thirds of the freezing path or zone. It has been found that this arrangement insures close contact between the belt and the evaporator surface, even throughout the area or zone or greater radius of curvature. The greater radius of curvature provides reduced frictions between the belt and the freezing surface, thus reducing the tension upon the belt which might otherwise become excessive. As has been indicated above, the lubricating fluid is distributed partially by the fluid pressure and partially by the track of the moving belt. The lubrication maintains a desired contact condition, and has special advantages in combination with the feature of two radii of curvature of the freezing surface.

The particular construction permits proper alignment and adjustment of the evaporator and the belt so as to maintain the belt transversely flat and in proper alignment. The construction permits the bend of the evaporator sub-assembly to the desired radius or radii of curvature. At the same time, the heat is conducted efficiently from the entire evaporator surface. This insures maximum efficiency in freezing or congealing on the surface of the belt, and it also insures uniformity in the viscosity of the lubricant and in the thickness of the lubricant film. It has been indicated above that the radii of curvature may be predetermined because the evaporator plate and tubes are flexible prior to the assembly into their frames. Thus, the curvatures may be changed by changing the contour of the plates 119 upon which the evaporator sub-assembly is mounted. The basic structure is such that the capacity may be changed by changing the size of the evaporator plate, for example, by increasing or decreasing either the length or width, or both. In this embodiment, there are ten evaporator tubes, and the evaporator plate is 12 inches in width, and the freezing zone is 66 inches in length. Illustratively, the lesser radius of curvature is 250 inches, and the greater radius of curvature is 300 inches. The pulleys 65 and 61 are 18 inches in diameter.

As many possible embodiments may be made in the above invention and as many changes might be made in the embodiments above set forth, it is to be understood that all matter hereinbefore set forth or shown in the accompanying drawings is to be interpreted as illustrative and not in the limiting sense.

I claim:

1. In congealing apparatus of the type wherein an endless belt passes through a congealing zone in contact with the surface of an evaporator, an elevated evaporator plate assembly which is flexible in a longitudinal direction whereby it is adapted to be flexed from a generally plane condition to a predetermined curvature and comprising means forming evaporator passageways for refrigerant and an evaporator surface in intimate heat conducting relationship with refrigerant within said passageways, said evaporator plate assembly comprising a flexible evaporator plate and a plurality of evaporator tubes extending longitudinally of said congealing zone and a pair of headers respectively at the ends of said tubes and nozzles at the ends of said tubes, said apparatus including a pair of castings attached to the opposite ends of said evaporator plate and clamped respectively to said headers and the ends of said tubes and means clamping said castings to said support means, support means presenting a support plane of predetermined contour which is curved in said longitudinal direction, clamping means holding said evaporator plate assembly against said supporting plane of said supporting means thereby imparting a predetermined contour to said evaporator plate assembly.

2. Congealing apparatus as described in claim 1, wherein said evaporator plate is supported to provide an arcuate surface throughout said evaporator congealing zone and having different radii of curvature, the smaller radius being at the end of the zone where the belt enters and extending a substantial extent longitudinal thereof.

3. Congealing apparatus as described in claim 1, wherein said support means includes a plurality of parallel contour plates against which said evaporator plate rests, and means rigidly mounting said contour plates.

4. Congealing apparatus as described in claim 3, wherein one of said castings includes means to supply fluid between the belt and said evaporator surface, and means in the other of said castings to collect and discharge fluid.

5. Congealing apparatus as described in claim 3, wherein the refrigerant is delivered to said evaporator tubes at the end of the congealing zone where the belt enters and is withdrawn at the opposite end.

6. In congealing apparatus, a rigid evaporator assembly presenting an evaporator surface having an extended longitudinal dimension at an angle to the horizontal, a pair of rollers mounted at the opposite ends of said evaporator surface, an endless belt mounted upon said rollers and extending in contact with said evaporator surface and presenting a top congealing surface, and belt tightening means comprising a pair of slidable journals and upper and lower track means slidably mounting said journals thereby adjustably mounting one of said rollers for movement of the roller axis in a plane generally parallel to the longitudinal dimension of said evaporator surface and including means to move said last-mentioned roller downwardly from said evaporator surface comprising means swingably mounting the lower of said track means to swing downwardly and to support said journals during such movement.

7. Congealing apparatus as described in claim 6 which includes a pair of screw bolts and nuts thereon which are tightened to hold said track means in the belt-tightening position and which are loosened to swing said track means downwardly.

8. Congealing apparatus as described in claim 6, which includes removable support means at one side of the apparatus for said rollers and said evaporator assembly which may be removed for the assembly and removal of said belt.

9. Apparatus as described in claim 6, which includes a pair of parallel frame members extending between the ends of said rollers, and precooler means mounted above said belt and adapted to precool liquid and deposit it at the upper level of said congealing surface.

10. Congealing apparatus as described in claim 9, wherein said precooler means includes three precooler units which extend longitudinally above said congealing surface and which are arranged to flow liquid from one to the next in series and thence to said congealing surface, means to collect uncongealed liquid which flows from said congealing surface, means to pump said uncongealed liquid to the lower of said precooler units, and means to supply liquid to be congealed to the upper of said precooler units.

11. Congealing apparatus as described in claim 10, wherein each of said precooler units comprises, a horizontal tray, partition means within said tray to provide an elongated flow path for liquid therein, an evaporator tube attached to the bottom of said tray, and weir means to control the flow of liquid from the discharge end of said unit.

12. Congealing means as described in claim 9, wherein said belt has heat insulating and fluid flow control means mounted upon its edges and extending above and below the edges of said evaporator surface.

13. Congealing apparatus as described in claim 6, which includes a pair of guide rollers mounted at the opposite edges of said belt at the zone where said belt moves towards said evaporator surface.

14. In congealing apparatus of the type wherein an endless belt passes through a congealing zone in contact with the surface of an evaporator, a stationary evaporator formed by a flexible evaporator plate and a pulrality of evaporator tubes positioned in parallel relationship and in intimate heat conducting relationship with the side of said evaporator plate opposite said evaporator surface, means forming a rigid and substantially continuous supporting surface, means clamping said evaporator plate and said tubes to said supporting surface and holding said evaporator plate rigidly to provide an evaporator surface which is curved in the direction of the movement of the belt with the radius of curvature being substantially less throughout the zone where the belt enters than throughout the zone where the belt leaves and wherein the zone of radius of lesser curvature of the evaporator surface extends for substantially one-third of the congealing zone.

15. In congealing apparatus of the type wherein an endless belt passes through a congealing zone in contact with the surface of an evaporator, said evaporator having a contour of two different radii, the smaller radius being at the end of the congealing zone where the belt enters and extending approximately one-third of the longitudinal extent thereof, an elevated evaporator plate assembly which is flexible in a longitudinal direction whereby it is adapted to be flexed from a generally plane condition to a predetermined curvature and comprising means forming evaporator passageways for refrigerant and an evaporator surface in intimate heat conducting relationship with refrigerant within said passageways, support means presenting a support plane of predetermined contour which is curved in said longitudinal direction, and clamping means holding said evaporator plate assembly against said supporting plane of said supporting means thereby imparting a predetermined contour to said evaporator plate assembly.

References Cited in the file of this patent

UNITED STATES PATENTS

| | | |
|---|---|---|
| 668,378 | Korth | Feb. 19, 1901 |
| 706,511 | Barrath | Aug. 12, 1902 |
| 1,136,773 | Chapman | Apr. 20, 1915 |
| 1,742,194 | Bennett | Jan. 7, 1930 |
| 1,963,842 | Gay | June 19, 1934 |
| 2,602,304 | Randell | July 3, 1952 |
| 2,610,476 | Field | Sept. 16, 1952 |
| 2,664,592 | Ingraham | Jan. 5, 1954 |
| 2,677,249 | Mason | May 4, 1954 |
| 2,775,100 | Howe | Dec. 25, 1956 |
| 2,803,950 | Bayston | Aug. 27, 1957 |
| 2,812,644 | Newman | Nov. 12, 1957 |